United States Patent
Jang et al.

(10) Patent No.: US 9,093,933 B2
(45) Date of Patent: Jul. 28, 2015

(54) METHOD AND APPARATUS FOR MONITORING ROTATIONAL POSITION OF AN ELECTRIC MACHINE

(71) Applicant: GM GLOBAL TECHNOLOGY OPERATIONS LLC, Detroit, MI (US)

(72) Inventors: Jihoon Jang, Torrance, CA (US); Yo Chan Son, Torrance, CA (US); Steven E. Schulz, Torrance, CA (US); Leah Dunbar, Brighton, MI (US); Terry Murrell, San Pedro, CA (US); Daniel L. Kowalewski, Redondo Beach, CA (US); Silva Hiti, Redondo Beach, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 145 days.

(21) Appl. No.: 14/010,632

(22) Filed: Aug. 27, 2013

(65) Prior Publication Data
US 2015/0061563 A1    Mar. 5, 2015

(51) Int. Cl.
*H02P 7/00* (2006.01)

(52) U.S. Cl.
CPC .......... *H02P 7/0094* (2013.01); *H02P 2203/00* (2013.01)

(58) Field of Classification Search
CPC .......................... H02P 2203/00; H02P 7/0094
USPC ......... 318/490, 599, 603, 618, 621, 638, 652, 318/722, 463
See application file for complete search history.

(56) References Cited

U.S. PATENT DOCUMENTS

| | | | | |
|---|---|---|---|---|
| 4,061,950 A | * | 12/1977 | Kayanuma | 388/811 |
| 4,208,621 A | * | 6/1980 | Hipkins et al. | 318/400.21 |
| 4,398,138 A | * | 8/1983 | Kohzai et al. | 318/603 |
| 6,483,270 B1 | * | 11/2002 | Miyazaki et al. | 318/700 |
| 6,580,236 B2 | * | 6/2003 | Mitsuda | 318/400.17 |
| 2003/0037607 A1 | | 2/2003 | Minich et al. | |

FOREIGN PATENT DOCUMENTS

DE    10104795 A1    9/2002
DE   102010024238 A1   12/2011

OTHER PUBLICATIONS

Ohmae, T.; A Microprocessor-Controlled High-Accuracy Wide-Range Speed Regulator for Motor Drives; IEEE Transactions on Industrial Electronics; vol. IE-29, No. 3, Aug. 1982.

* cited by examiner

*Primary Examiner* — Bentsu Ro
*Assistant Examiner* — Thai Dinh

(57) ABSTRACT

A method for monitoring an electric motor employing a pulse-type rotational position sensor includes monitoring a signal output from the pulse-type rotational position sensor and a reference signal associated with a control signal for the electric motor. A position of a rotor of the electric motor coincident with the reference signal is determined based upon a nominal rotor position, a nominal rotational speed of the rotor and a time between the reference signal and a falling edge of the signal output from the pulse-type rotational position sensor. The electric motor is controlled based upon the position of the rotor.

12 Claims, 3 Drawing Sheets

METHOD AND APPARATUS FOR MONITORING ROTATIONAL POSITION OF AN ELECTRIC MACHINE

TECHNICAL FIELD

This disclosure is related to monitoring rotational position of electric machines.

BACKGROUND

The statements in this section merely provide background information related to the present disclosure and may not constitute prior art.

Multi-phase electric machines include motor/generator devices that are employed on mobile systems and are driven by electric power that is transformed from stored DC power to AC power via an inverter system. An exemplary electric motor includes a stator and a rotor, with a rotational position sensor employed to provide position feedback for speed and torque control. One known position sensor is a resolver, which is a variable reluctance induction machine including a stator and a rotor that are assembled onto the rotor and stator of the electric motor.

SUMMARY

A method for monitoring an electric motor employing a pulse-type rotational position sensor includes monitoring a signal output from the pulse-type rotational position sensor and a reference signal associated with a control signal for the electric motor. A position of a rotor of the electric motor coincident with the reference signal is determined based upon a nominal rotor position, a nominal rotational speed of the rotor and a time between the reference signal and a falling edge of the signal output from the pulse-type rotational position sensor. The electric motor is controlled based upon the position of the rotor.

BRIEF DESCRIPTION OF THE DRAWINGS

One or more embodiments will now be described, by way of example, with reference to the accompanying drawings, in which.

DETAILED DESCRIPTION

Figure 1:
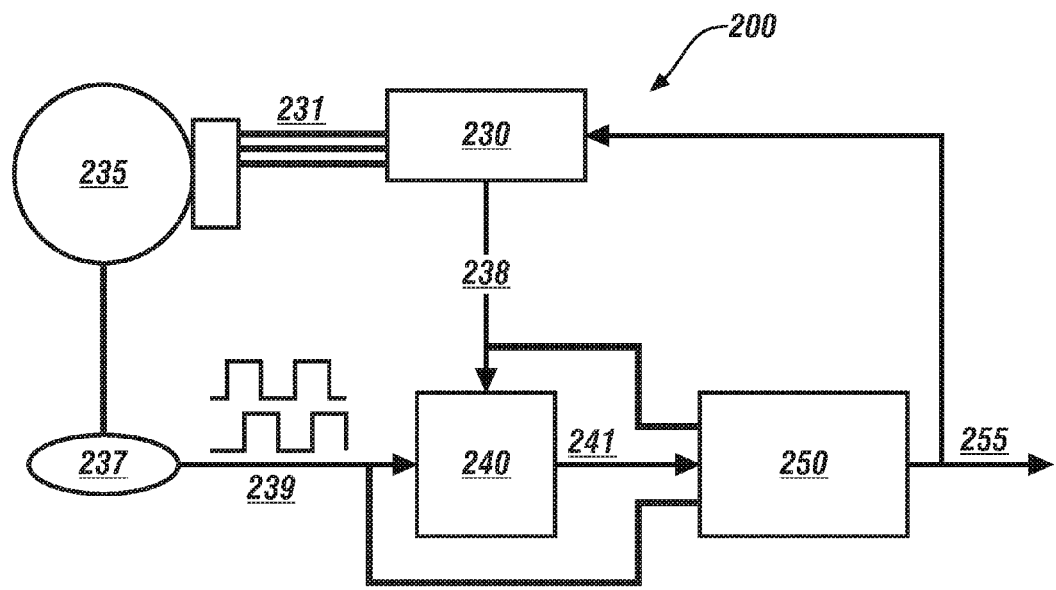
FIG. 1 illustrates a hardware configuration and related signal processing scheme for determining a rotational position of a rotor of an electric machine including a pulse-type rotational position sensor, in accordance with the disclosure.

Referring now to the drawings, wherein the showings are for the purpose of illustrating certain exemplary embodiments only and not for the purpose of limiting the same, FIG. 1 schematically shows a hardware configuration and related signal processing scheme 200 for determining a rotational position of a rotor of an electric machine 235 that employs a pulse-type rotational position sensor (pulse sensor) 237 mechanically connected to a rotor thereof to monitor rotational position of the rotor for purposes of positional feedback. The electric machine 235 is a multi-phase motor/generator employed to generate torque or transform torque to electric energy in one embodiment. A control system 230 includes an inverter that generates pulsewidth-modulated (PWM) signals 231 for controlling power flow to the electric machine 235 based upon the positional feedback, which is preferably in the form of an angular rotational position $\Theta_{Final}$[n] 255. The control system 230 also generates a PWM reference signal 238 that preferably indicates completion of one cycle of all the PWM signals 231.

The pulse sensor 237 can include any suitable edge-sensing device such as a magnetoresistive (MR) sensor or a digital Hall-effect sensor. The pulse sensor 237 preferably includes a stationary sensing element mounted on the stator of the electric machine 235 that is aligned with an encoder that is mounted on a shaft of the rotor of the electric machine 235, and includes one, or alternatively, two edge detecting devices. The encoder includes a plurality of teeth having edges that are detectable by the sensing element as the rotor and attached encoder rotate. In one non-limiting embodiment, the encoder includes 60 (less 2 absent) regularly distributed teeth having leading and falling edges, with each tooth corresponding to 6° of rotor and encoder rotation, and the 2 absent teeth employed for purposes of synchronizing the sensor with the position of the rotor and detecting a direction of rotation, e.g., clockwise and counter-clockwise rotation. Such an encoder is can be referred to as a 58X target wheel when employed on an automotive application.

The pulse sensor 237 generates output signals 239 that are preferably in the form of a square wave that are input to a counter 240 in response to rotation of the rotor and the encoder. The counter 240 monitors the output signals 239, including counting a quantity of cycles of the output signals 239 that occur between sequentially occurring PWM reference signals PWM[n−1] and PWM[n] 238. The counter output ($\Delta N_p$[n]) 241 is monitored and employed in a position calculation routine 250 to determine the angular rotational position $\Theta_{Final}$[n] 255 of the multi-phase electric machine 235 at the time of the PWM reference signal PWM[n] 238.

The position calculation routine 250 is preferably executed in a controller. Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinatorial logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
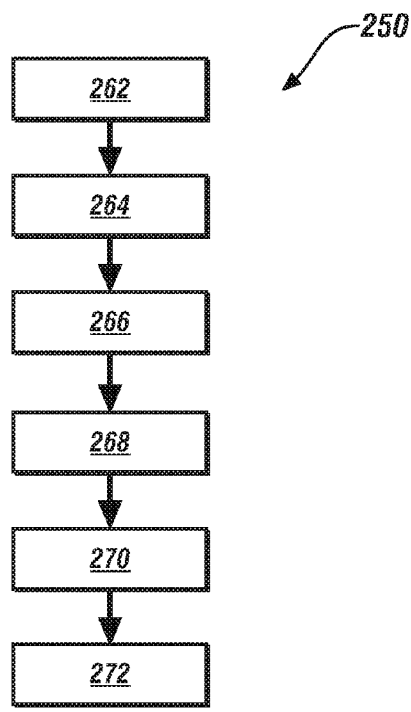
FIG. 2 illustrates a position calculation routine that can be employed to determine a rotational position of a rotor of an electric machine that employs the pulse sensor, in accordance with the disclosure.
Figure 3:
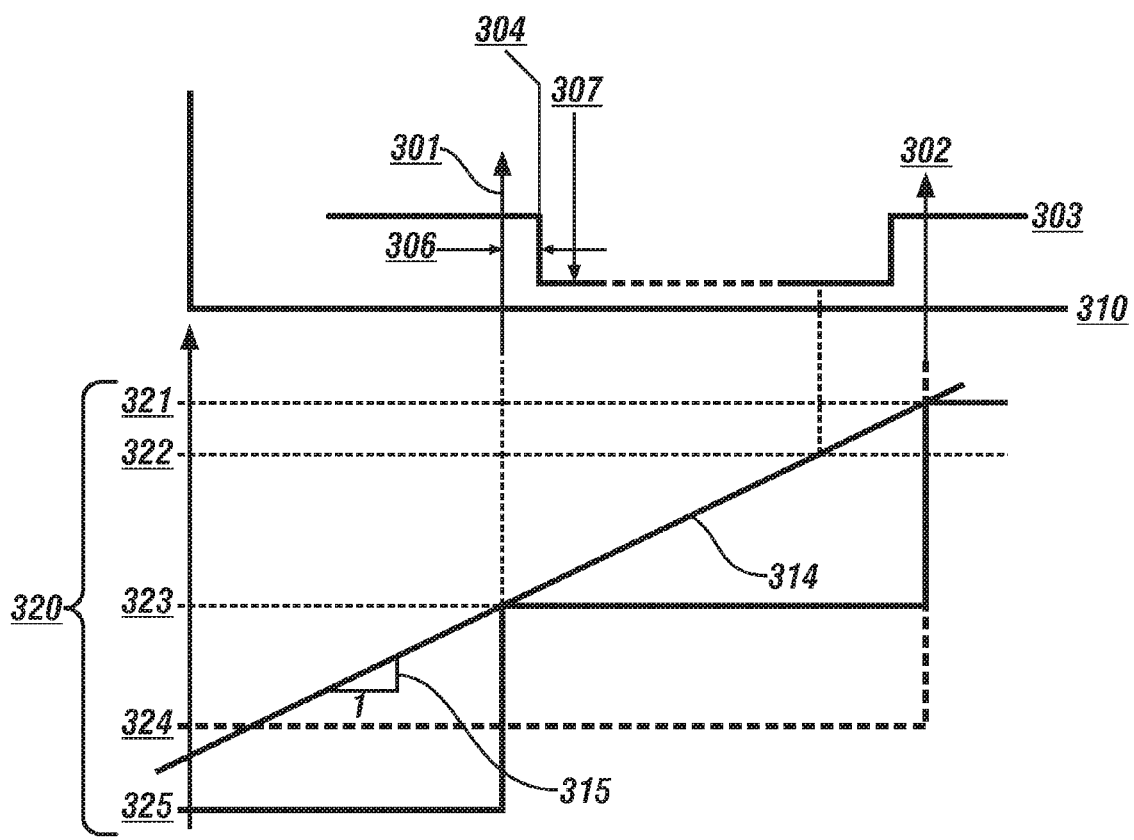
FIG. 3 illustrates a plurality of signals associated with the position calculation routine of FIG. 2, in accordance with the disclosure.

FIG. 2 schematically shows an embodiment of the position calculation routine 250 that can be employed to determine a rotational position of a rotor of an electric machine that employs a pulse sensor that mechanically connects to the rotor to monitor its rotational position. The preferred electric machine is subject to a control system that includes a pulse-width-modulation (PWM) signal for controlling the electric machine that includes PWM reference signals. One embodiment of the pulse sensor and electric machine is described with reference to FIG. 1. FIG. 3 graphically shows a plurality of signals associated with the position calculation routine 250, with the signals depicted on the vertical y-axis in relation to time 310 on the horizontal x-axis. Monitored signals include PWM reference signals 301 and 302, which correspond to the PWM reference signal 238 described with reference to FIG. 1. Monitored signals include the position sensor output 303, which is a square wave having a plurality of rising and falling edges that correspond to edges of the encoder teeth that are detectable by the sensing element as the rotor rotates, and correspond to the output signals 239 generated by the pulse sensor 237 described with reference to FIG. 1. Other signals of interest during the course of execution of the position calculation routine 250 include an actual rotor position line 314, characterized by a slope 315 and a plurality of calculated rotor positions 320. Table 1 is provided as a key to the position calculation routine 250 of FIG. 2 wherein the numerically labeled blocks and the corresponding functions are set forth as follows.

TABLE 1

| BLOCK | BLOCK CONTENTS |
| --- | --- |
| 262 | Monitor signal output from sensor |
| 264 | Monitor PWM reference signal |
| 266 | Determine ΔT [k] |
| 268 | Determine θ$_{MT}$[k], ω$_{MT}$ [k − 1] |
| 270 | Determine rotor position coincident with the PWM reference signal<br>θ$_{Final}$ [k] = θ$_{MT}$ [k] + ω$_{MT}$ [k − 1] × ΔT[k] |
| 272 | Control motor operation employing θ$_{Final}$ [k] |

The position calculation routine 250 ongoingly monitors the sensor signal, shown as 303 on FIG. 3, and periodically occurring PWM reference signals, shown as 301 and 302 on FIG. 3 (262, 264). A HWIO time point, shown as reference 307 in FIG. 3, provides a time point at which the HWIO output of the pulse sensor is employed to calculate rotational speed and position of the rotor. An elapsed time ΔT[k] is determined (266), and is shown at 306 on FIG. 3. The elapsed time ΔT[k] 306 is a measure of the time from the first PWM reference signal 301 to an edge 304 of the sensor signal 303 that occurs immediately prior to the HWIO time point 307. The edge 304 of the sensor signal that occurs immediately subsequent to the PWM reference signal 301 is shown as a falling edge in FIG. 3. The reference line 307 is the time point at which the sensor signal is employed in calculating rotational speed of the rotor.

Nominal rotor position θ$_{MT}$[k] and nominal speed ω$_{MT}$[k−1] can be regularly determined using a known processor-implemented calculation method referred to as the M/T method (268). The M/T method is a combination of a known M method and a known T method for calculating rotational speed using discrete processor devices and discrete sensors. The M method calculates a rotational speed Nm by counting the quantity of sensor pulses that occur during a fixed time interval, and calculating speed based thereon. One exemplary calculation includes as follows:

$$Nm = m^* \alpha / T$$

wherein
α a is rotational angle of the rotor in mechanical degrees between two adjacent pulses,
m is the quantity of clock pulses, and
T is the sampling period.

Figure 4:
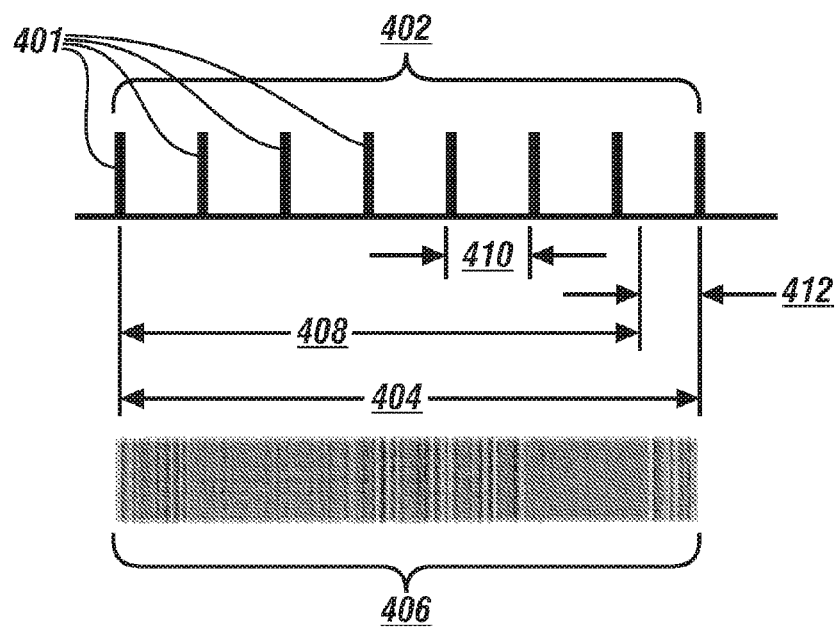
FIG. 4 illustrates a timeline including a plurality of sensor pulses and depicts measurements associated with execution of an M/T method to determine rotational speed during ongoing operation, in accordance with the disclosure.

The T method calculates a rotational speed Nt by measuring the time interval between adjacent pulses as follows:

$$Nt = \alpha^* f / m$$

wherein
α is rotational angle of the rotor in mechanical degrees between two adjacent pulses,
f is the frequency of a clock pulse train, and
m is the quantity of clock pulses FIG. 4 graphically shows a timeline including a plurality of sensor pulses 401 and depicts measurements associated with the M/T method to determine rotational speed during ongoing operation. Measured parameters of interest include a discrete quantity m1 402 of sensor pulses 401 occurring over a time interval Td 404 for sampling the rotational speed, with the start of the time interval Td 404 synchronized with a first of the sensor pulses 401, a quantity of clock pulses m2 406 during the fixed time interval Td 404, a nominal sampling period Tsp 408, rotational angle of the rotor α 410 in mechanical degrees between two of the adjacent sensor pulses 401, and elapsed time ΔT 412, which is a difference between the fixed time interval Td 404 and the nominal sampling period Tsp 408.

The M/T method calculates the rotational speed ω$_{MT}$ for the sampling period in accordance with the following relationship:

$$\omega_{MT} = \frac{m1 * \alpha}{Ppr(Tsp + \Delta T)} \quad [1]$$

wherein
m1 is the discrete quantity of sensor pulses occurring over time interval Td for sampling the rotational speed, and
Ppr is a resolution of the encoder as indicated by quantity of pulses per revolution of the encoder.

In one embodiment, the resolution of the encoder is 6° of angular rotation, with the quantity of pulses per revolution (Ppr) equal to 60.

An embodiment of the M/T method can be employed to calculate a nominal rotational position θ$_{MT}$[k] 322, a previous rotational position θ$_{MT}$[k−1] 324 and rotational speed ω$_{MT}$ [k−1] 314 employing suitable monitoring and position calculating schemes. Previous final rotational positions θ$_{Actual}$[k−2] 325 and θ$_{Actual}$[k−1] 323 are shown, wherein the final rotational position θ$_{Actual}$[k−1] 323 is determined at the PWM reference signal 301 (268).

Rotor position coincident with the PWM reference signal 302 is determined in accordance with the following relationship:

$$\theta_{Final}[k] = \theta_{MT}[k] + \omega_{MT}[k-1] \times \Delta T[k] \quad [2]$$

wherein
θ$_{Final}$[k] 321 is the final rotor position at the present PWM reference line 302, $\theta_{MT}[k]$ 322 is the nominal rotor position at the PWM reference line 302, which is determined employing the M/T method, $\omega_{MT}[k-1]$ 315 is the nominal rotational speed of the rotor, which is determined employing the M/T method, and $\Delta T[k]$ 306 is the elapsed time from the initial PWM reference signal 301 to the falling edge of the sensor signal 304 that occurs immediately prior to the HWIO time point 307 at which the HWIO output of the pulse sensor is employed to calculate rotational speed and position of the rotor (270).

Operation of the motor can be controlled employing the signal $\theta_{Final}[k]$, which indicates rotor position (270). Such operation includes, with reference to the hardware configuration and related signal processing scheme 200 of FIG. 1, generating the pulsewidth-modulation (PWM) signals 231 for controlling power flow to the electric machine 235 to convert stored DC electric power originating in a high-voltage battery to AC electric power to drive the torque machine 235 to generate torque in one embodiment.

Figure 5:
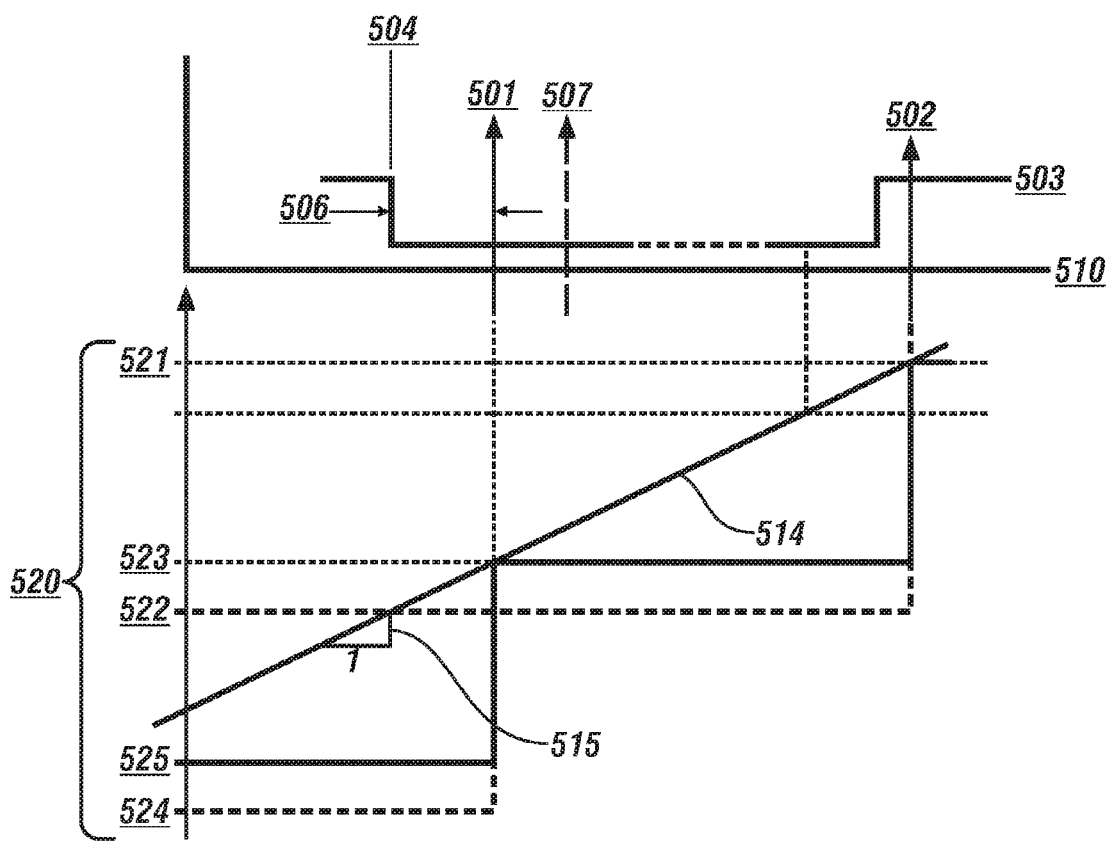
FIG. 5 illustrates a plurality of signals associated with the position calculation routine described with reference to FIG. 2, in accordance with the disclosure.

FIG. 5 graphically shows a second set of signals associated with the position calculation routine 250, with the signals depicted on the vertical y-axis in relation to time 510 on the horizontal x-axis. Monitored signals include PWM reference signals 501 and 502, which correspond to the PWM reference signal 238 described with reference to FIG. 1. Monitored signals include the position sensor output 503, which is a square wave having a plurality of rising and falling edges that correspond to edges of the encoder teeth that are detectable by the sensing element as the rotor rotates, and correspond to the output signals 239 generated by the pulse sensor 237 described with reference to FIG. 1. Other signals of interest during the course of execution of the position calculation routine 250 include an actual rotor position line 514, characterized by a slope 515 and a plurality of calculated rotor positions 520. As shown, the edge 504 of the sensor signal 503 occurs immediately prior to the first PWM reference signal 501 and prior to the HWIO time point 507.

Rotor position coincident with the PWM reference signal 502 is determined in accordance with the following relationship:

$$\theta_{Final}[k]=\theta_{MT}[k]+\omega_{MT}[k-1]\times\Delta T[k] \quad [3]$$

wherein $\theta_{Final}[k]$ 521 is the final rotor position at the present PWM reference line 502, $\theta_{MT}[k]$ 522 is the nominal rotor position at the PWM reference line 502, which is determined employing the M/T method, $\omega_{MT}[k-1]$ 515 is the nominal rotational speed of the rotor, which is determined employing the M/T method, and $\Delta T[k]$ 506 is the elapsed time from the falling edge of the sensor signal 504 and position of the rotor to the initial PWM reference signal 501 that occurs immediately prior to the HWIO time point 507 at which the HWIO output of the pulse sensor is employed to calculate rotational speed.

Thus, the rotor position coincident with the PWM reference signal 502 can be determined when the falling edge of the sensor signal 504 occurs prior to the initial PWM reference signal 501 immediately prior to the HWIO time point 507 at which the HWIO output of the pulse sensor is employed to calculate rotational speed.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for monitoring an electric motor employing a pulse-type rotational position sensor, comprising:
   monitoring a signal output from the pulse-type rotational position sensor and a reference signal associated with a control signal for the electric motor;
   determining a position of a rotor of the electric motor coincident with the reference signal based upon a nominal rotor position, a nominal rotational speed of the rotor and a time between the reference signal and a falling edge of the signal output from the pulse-type rotational position sensor; and
   controlling the electric motor based upon the position of the rotor.

2. The method of claim 1, wherein determining the position of the rotor coincident with the PWM reference signal comprises determining the position of the rotor in accordance with the following relationship:

$$\theta_{Final}[k]=\theta_{MT}[k]+\omega_{MT}[k-1]\times\Delta T[k]$$

wherein $\theta_{Final}[k]$ is the position of the rotor, $\theta_{MT}[k]$ is the nominal rotor position, $\omega_{MT}[k-1]$ is the nominal rotational speed of the rotor, and $\Delta T[k]$ is the time between the reference signal to the falling edge of the signal output from the pulse-type rotational position sensor.

3. The method of claim 1, wherein the nominal rotational speed of the rotor is determined in accordance with the following relationship:

$$\omega_{MT} = \frac{m1 * \alpha}{Ppr(Tsp + \Delta T)}$$

wherein $\omega_{MT}$ is the nominal rotational speed

Tsp is a sampling period, m1 is a discrete quantity of sensor pulses during the sampling period Tsp, said sensor pulses comprising the signal output from the pulse-type rotational position sensor, $\alpha$ is a rotational angle of the rotor between two adjacent sensor pulses, $\Delta T$ is an elapsed time that is a difference between a fixed time interval and the sampling period Tsp, and Ppr is a resolution of an encoder of the pulse-type rotational position sensor.

4. The method of claim 1, wherein monitoring the reference signal associated with the control signal for the electric motor comprises monitoring a PWM reference signal indicating completion of one cycle of signals for controlling power flow to the electric motor.

5. The method of claim 1, wherein monitoring the signal output from the pulse-type rotational position sensor comprises monitoring signal output from an edge-sensing device comprising a magnetoresistive sensor including a stationary sensing element mounted on the stator of the electric motor, said magnetoresistive sensor monitoring an encoder mounted on a shaft of the rotor of the electric motor.

6. The method of claim 1, wherein monitoring the signal output from the pulse-type rotational position sensor comprises monitoring signal output from an edge-sensing device comprising a digital Hall-effect sensor including a stationary sensing element mounted on the stator of the electric motor, said digital Hall-effect sensor monitoring an encoder mounted on a shaft of the rotor of the electric motor.

7. A method for monitoring a multi-phase electric machine including an inverter generating pulsewidth-modulation signals for controlling power flow to generate torque, the electric machine employing a low-resolution pulse-type rotational position sensor for positional feedback, comprising:

monitoring a signal output from the low-resolution pulse-type rotational position sensor and a reference signal associated with a control signal for the electric machine originating from the inverter;

determining a position of a rotor of the electric machine coincident with the reference signal based upon a nominal rotor position, a nominal rotational speed of the rotor and a time between the reference signal and a signal output from the low-resolution pulse-type rotational position sensor; and controlling the electric machine based upon the position of the rotor.

8. The method of claim 7, wherein determining a position of the rotor coincident with the PWM reference signal comprises determining the position of the rotor in accordance with the following relationship:

$$\theta_{Final}[k] = \theta_{MT}[k] + \omega_{MT}[k-1] \times \Delta T[k]$$

wherein
$\theta_{Final}[k]$ is the position of the rotor,
$\theta_{MT}[k]$ is the nominal rotor position,
$\omega_{MT}[k-1]$ is the nominal rotational speed of the rotor, and
$\Delta T[k]$ is the time from the reference signal to the signal output from the low-resolution pulse-type rotational position sensor.

9. The method of claim 7, wherein the nominal rotational speed of the rotor is determined in accordance with the following relationship:

$$\omega_{MT} = \frac{m1 * \alpha}{Ppr(Tsp + \Delta T)}$$

wherein
$\omega_{MT}$ is the nominal rotational speed of the rotor
Tsp is a nominal sampling period,
m1 is a discrete quantity of sensor pulses during the sampling period Tsp, said sensor pulses comprising the signal output from the low-resolution pulse-type rotational position sensor,
$\alpha$ is a rotational angle of the rotor between two of adjacent sensor pulses,
$\Delta T$ is an elapsed time that is a difference between a fixed time interval and the nominal sampling period Tsp, and
Ppr is a resolution of an encoder of the low-resolution pulse-type rotational position sensor.

10. The method of claim 7, wherein monitoring the reference signal associated with the control signal for the electric machine comprises monitoring a PWM reference signal indicating completion of one cycle of signals for controlling power flow to the electric machine.

11. The method of claim 7, wherein monitoring the signal output from the low-resolution pulse-type rotational position sensor comprises monitoring signal output from a magnetoresistive sensor including a stationary sensing element mounted on the stator of the electric machine, said magnetoresistive sensor monitoring a low-resolution encoder mounted on a shaft of the rotor of the electric machine.

12. The method of claim 7, wherein monitoring the signal output from the low-resolution pulse-type rotational position sensor comprises monitoring signal output from an edge-sensing device comprising a digital Hall-effect sensor including a stationary sensing element mounted on the stator of the electric machine, said digital Hall-effect sensor monitoring a low-resolution encoder mounted on a shaft of the rotor of the electric machine.

* * * * *